INVENTOR
ROBERT ANDREW WRIGHT
BY
ATTORNEYS

Jan. 21, 1969    R. A. WRIGHT    3,422,971
STORAGE ARRANGEMENTS
Filed March 7, 1967    Sheet 2 of 2

INVENTOR
ROBERT ANDREW WRIGHT
BY
Linchiten, Linchiten & Ottinger

ATTORNEYS

United States Patent Office 3,422,971
Patented Jan. 21, 1969

3,422,971
STORAGE ARRANGEMENTS
Robert Andrew Wright, Canterbury, England, assignor to The General Electric Company Limited, London, England, a British company
Filed Mar. 7, 1967, Ser. No. 621,244
Claims priority, application Great Britain, Mar. 8, 1966, 10,136/66
U.S. Cl. 214—15           6 Claims
Int. Cl. B63b 27/00

ABSTRACT OF THE DISCLOSURE

A storage arrangement, especially for cargo-carrying ships, having a plurality of coaxial and independently rotatable storage platforms situated one above the other, each except the lowest having an opening which can be aligned vertically with a loading position, the arrangement enabling any selected platform to be loaded or unloaded from above without disturbing articles stored on the other platforms.

This invention relates to storage arrangements and has particular, though not exclusive application to cargo-carrying ships.

According to this invention a storage arrangement comprises a plurality of circular platforms which are mounted for independent coaxial rotation in respective spaced horizontal planes and driving means for the platforms, at least each platform other than the bottom platform having an aperture formed therein, which aperture can be brought into vertical alignment with a loading position, the arrangement being such that each platform can be indexed relatively to the other platforms so that articles may be deposited thereon, or removed therefrom, progressively by loading means movable vertically through said loading position. In order to enable any selected platform below the top platform to be loaded or unloaded this may readily be achieved by indexing each platform above it to the respective position in which its aperture is in vertical alignment with the loading position, the loading means then being lowered through said aperture or apertures to deposit articles on, or remove them from, said selected lower platform.

The driving means may comprise a motor coupled to a single driving shaft which extends vertically over the height of the platforms and adjacent the latter, and the shaft may be coupled to each platform through gearing and a clutch. Thus, by suitable operation of the clutches, any selected platform may be indexed relatively to the other platforms, and further, if required, a number of platforms may be rotated in unison to a desired position. However, the individual platforms may be drivably connected to separate motors is desired.

The storage arrangement has application, for example, in cargo-carrying ships in which case a circular platform would be provided at each deck level required for cargo, and access to the storage arrangement would be provided by a hatchway provided in the upper deck of the ship, said hatchway constituting the loading position for the storage arrangement.

Thus, the invention provides a convenient and simple storage arrangement in which articles may be readily loaded with a minimum amount of movement required of the loading means, and further, any selected article may be readily removed from the storage arrangement, even when the latter is fully loaded, by appropriate indexing of the platforms and operation of the loading means.

The loading means is conveniently provided by a crane forming part of the ship itself and mounted on the upper deck of the ship, although separate cranes, for example on a dock-side, could alternatively be employed for this purpose where no crane is provided on the ship itself.

Figure 1:
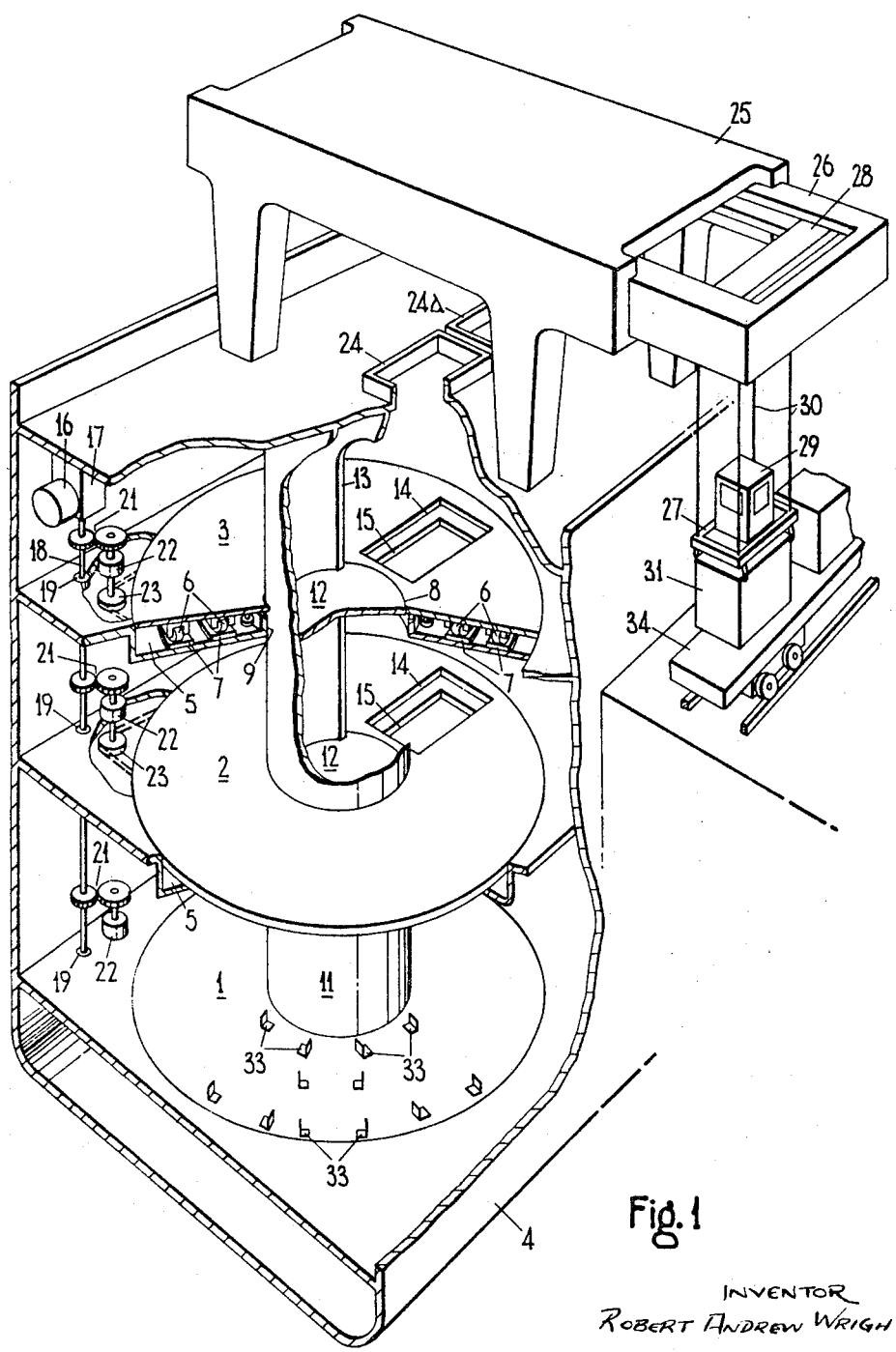
Figure 2:
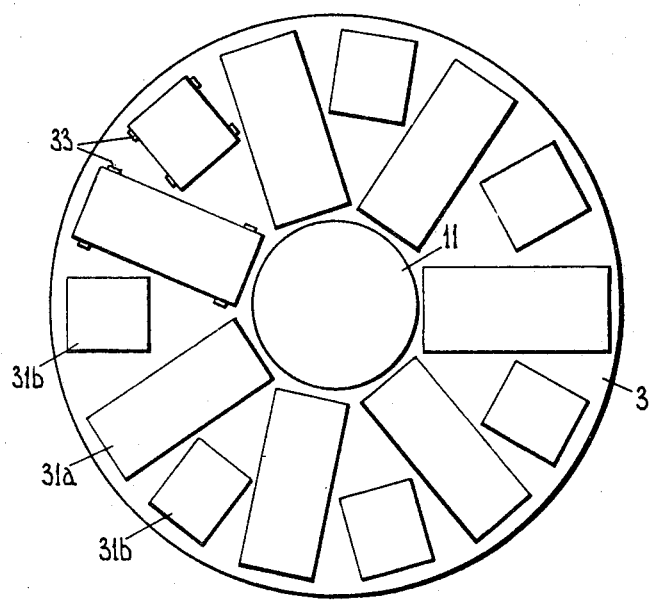
Figure 3:
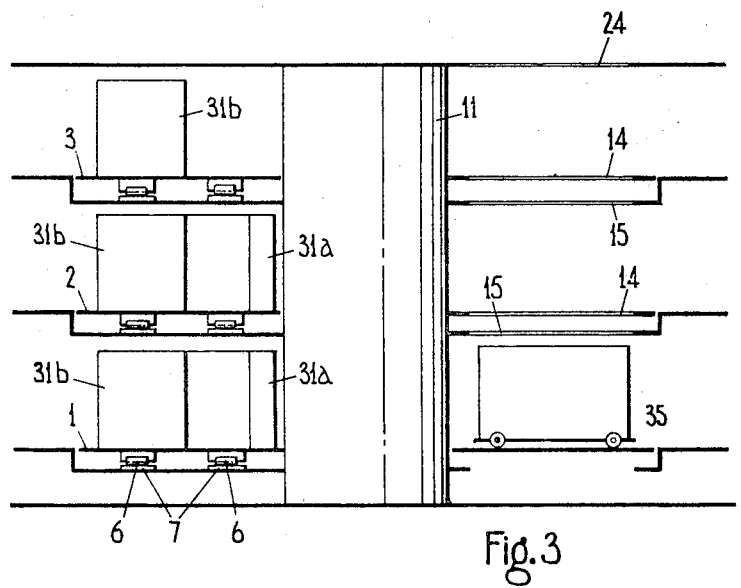

In order that the invention may be readily understood, and further features made apparent, a storage arrangement constructed in accordance with the invention and designed for use in a cargo-carrying ship will now be described by way of example with reference to FIGURES 1 to 3 of the accompanying schematic drawings in which FIGURE 1 represents diagrammatically and not to scale, a cut-away perspective view of the arrangement and its ancillary equipment, and FIGURES 2 and 3 represent, also in diagrammatic form, a plan view and side view of the arrangement.

Referring to the drawing, the arrangement comprises essentially three circular platforms 1, 2 and 3 which are mounted coaxially in vertically-spaced relationship one at each intermediate deck level of the ship 4. The platforms are positioned in circular wells 5 formed in their respective decks and each platform is mounted for independent rotation in its wells by two annular lines of rollers 6 carried by the underneath surface of the platform, which rollers engage a pair of annular tracks 7 mounted in the well. The platforms and wells are provided with central circular apertures 8 and 9 respectively and a tubular shaft 11 extends vertically through these apertures between the uppermost and lowermost decks of the ship 4. The shaft 11 is provided with a floor 12 and an entrance 13 at each deck level the purpose of which will be made apparent hereinafter. Each of the platforms other than the lowermost platform 3, is provided with a rectangular aperture 14 in a sector thereof, and the platforms can be indexed to positions in which they cooperate with corresponding apertures 15 formed in their wells 5, the apertures 15 being disposed in vertical alignment. The driving means for the platforms comprise a motor 16 mounted on No. 3 deck level which is connected through a worm drive gearbox 17 to one end of a driving shaft 18 which extends vertically through the deck levels to the lowermost deck, the shaft being journalled in bearings 19 at the positions where it passes through the deck levels. The driving shaft is connected to each platform via gearing 21, a clutch 22 and a chain and sprocket arrangement 23, and thus any selected one or more of the platforms may be rotated by the driving means by suitable operation of the clutches 21. A spring-biased idler sprocket (not shown) is conveniently associated with each chain to maintain it at an appropriate tension.

The upper deck is provided with a hatchway 24 which is in vertical alignment with the apertures 15 of the wells 5, and is positioned beneath a loading gantry 25. The gantry carries a gantry frame 26 which is capable of outward movement from the gantry on either side of the ship and on this gantry frame runs a crab 28 which supports in turn, by means of cables 30 a vertically moving lifting frame 27; a control cabin 29 is mounted on the lifting frame as shown.

In this particular arrangement the platforms are designed to carry containerised cargo of two different lengths, and in order to utilise the maximum space on the platforms, the containers 31 are laid on the platform surfaces in a radial fashion and alternate in their lengths as shown at 31a and 31b in FIGURE 2 of the drawing, the containers being located and locked in their respective positions by sets of clamps 33 (only some of which are shown).

In operation, the platforms of the storage arrangement are loaded progressively in turn from the lowermost platform 1 to the uppermost platform 3.

This is achieved by first operating the driving means to index the platforms 2 and 3 to positions in which their apertures 14 are aligned with the apertures 15 of the wells 5 and hence in vertical alignment with the hatchway 24. The gantry frame 26 is then extended outwards over the dock-side and the crab and lifting frame 28, 27, are then controlled to lift the containners, which are conveniently carried to the dockside on flat rail cars 34, from the dock-side to a loading position directly over the hatchway 24, the lifting frame then being lowered through the apertures 14 and 15 to deposit the container in its location defined by a set of clamps 33 on the platform 1. The lifting frame 27 is then raised and the platform 1 indexed by the driving means to bring the next set of clamps 23 in vertical alignment with the loading position ready to receive the next container. Thus, the containers are progressively loaded onto the platform 1 until this platform is fully loaded, and then the procedure is repeated to fill the platform 2, and finally the platform 3. It will be appreciated that if the storage arrangement is required to be filled to its maximum capacity, a cover (not shown) can be placed over the aperture 14 of each of the platforms 2 and 3 pior to their loading and a further container deposited on this cover.

It will also be appreciated that with the storage arrangement described, any selected container can be readily removed therefrom by indexing the platforms to their appropriate positions; even in the case where the arrangement is loaded to its maximum, and it is required to remove a container from the lowermost platform 1, only two further containers and two apertures covers would first need to be removed from the arrangement to give access to the required container. Thus, the arrangement is particularly suitable for ships which require to unload only part of their cargo at any one port, since the unloading operation may take place substantially without disturbing the rest of the cargo.

The storage arrangement as described would normally be provided one for each hold of the ship and the hatchways 24, 24a, for adjacent holds could be positioned close to one another as shown in the drawing to enable them to share a common loading means and to reduce the movements required of the lifting frame 27 to a minimum.

The floors 12 of the tubular shaft 11 can if necessary provide room for general storage, since this space would otherwise not be utilised by the storage arrangement described.

Further bulk storage space could also be provided in the deck spaces around the periphery of the rotatable platforms, and if desired each platform may be associated with at least one movable carrier member capable of being brought into vertical alignment with the hatch 24 by appropoate rotation of the platform for rreceiving containers or other articles of cargo from the lifting frame, and being movable outwards from the platform to carry the articles to these outer stroage positions. One such carrier member is represented diagrammatically at 35 on the lowermost platform of FIGURE 3. The carrier member can conveniently include a transfer device which is capable of dopositing articles supported by the member at a required outer storage position, the empty carrier member then being returnable to the platform for receiving further articles and carrying them to other storage positions.

I claim:

1. An article storage arrangement comprising a plurality of circular platforms, means mounting said platforms for independent coaxial rotation in respective spaced horizontal planes, at least each platform other than the bottom platform having an aperture formed therein, which aperture can be brought by rotation of the platform into vertical alignment with a loading position, driving means for said platforms comprising a motor coupled to a driving shaft extending vertically over the height of the platforms, gearing coupling said shaft to each platform and a respective clutch to permit each platform to be indexed by said motor, shaft and gearing relatively to the other platforms, and loading means mounted above said platforms and carrying a movable lifting device for said articles, said loading means including means for moving said loading device vertically through said loading position to permit articles to be progressively deposited on or removed from said platforms by an appropriate indexing of the platforms.

2. An article storage arrangement according to claim 1 including for each platform carrier means capable of being brought into vertical alignment with the loading position by appropriate rotation of the platform for enabling articles to be loaded on to the carrier means by the lifting device of said loading means and the carrier means being movable outwards from the platform for carrying said articles to one or more storage positions clear of the platform.

3. An article storage arrangement according to claim 2 wherein the carrier means includes a transfer device for depositing articles supported by the carrier means at a said storage position, the carrier means being returnable to the platform following the depositions of an article for receiving further articles from the lifting device of the loading means, and being movable with said further articles to other storage positions.

4. A cargo-carrying ship comprising a plurality of circular horizontal platforms, an upper deck, means mounting said platforms for independent coaxial rotation one above the other below said upper deck, means providing a hatchway in said upper deck, each platform being located at a respective deck level required for cargo storage, at least each platform other than the bottom platform having an aperture which can be brought into vertical alignment with said hatchway by rotation of the platform, driving means for said platforms which permits each platform to be indexed relatively to the other platforms, a crane mounted above the upper deck and carrying a lifting device for articles of cargo, said crane including means for lowering and raising said lifting device through said hatchway to permit said articles of cargo to be progressively deposited on or removed from said platforms by an appropriate indexing of the platforms.

5. A cargo-carrying ship according to claim 4 wherein the crane comprises a gantry located above said hatchway, a movable gantry-frame carried by said gantry and carrying in turn said lifting device which is movalbe by said gantry frame from a loading position above said hatchway to a position on either side of said ship, and means for raising and lowering the lifting device relative to the gantry frame.

6. A cargo-carrying ship according to claim 5 wherein the upper deck has two hatchways, each associated with a different set of rotatable platforms, and the lifting device is supported by a crab which is carried by the gantry frame and is movable relative to it in a direction transverse to the direction of movement of the gantry frame on the gantry, for enabling the lifting device to be lowered selectively through either of the two hatchways.

References Cited

UNITED STATES PATENTS 2,564,966 8/1951 Farrell.
3,204,785 9/1965 Bajulaz.

FOREIGN PATENTS 1,357,097 2/1964 France.

GERALD M. FORLENZA, *Primary Examiner.*

F. E. WERNER, *Assistant Examiner.*

U.S. Cl. X.R.

214—16.4